United States Patent [19]
Dräxlmaier, Sr.

[11] Patent Number: 5,205,186
[45] Date of Patent: Apr. 27, 1993

[54] STEERING WHEEL

[75] Inventor: Fritz Dräxlmaier, Sr., Vilsbiburg, Fed. Rep. of Germany

[73] Assignee: Eldra-Kunststofftechnik GmbH, Geisenhausen, Fed. Rep. of Germany

[21] Appl. No.: 728,755

[22] Filed: Jul. 8, 1991

Related U.S. Application Data

[63] Continuation of Ser. No. 492,729, Mar. 13, 1990, abandoned.

[30] Foreign Application Priority Data

May 23, 1989 [DE] Fed. Rep. of Germany ... 8906358[U]

[51] Int. Cl.⁵ .............................................. B62D 1/06
[52] U.S. Cl. ........................................ 74/558; 74/552
[58] Field of Search ............... 74/558, 552, 551.9; 29/159 B, 105; 150/146

[56] References Cited

U.S. PATENT DOCUMENTS

| | | | |
|---|---|---|---|
| 1,142,780 | 6/1915 | Younger | 74/552 |
| 1,680,646 | 8/1928 | Smith | 74/552 |
| 3,802,291 | 4/1974 | Young, Jr. et al. | 74/552 |
| 3,945,416 | 3/1976 | Rim | 74/558 |
| 4,118,455 | 10/1978 | Byrn | 74/558 |
| 4,179,950 | 12/1979 | Valley | 74/558 |
| 4,547,655 | 10/1985 | Kurata et al. | 74/552 |
| 4,581,954 | 4/1986 | Uchida | 74/558 |
| 4,729,416 | 3/1988 | Miller | 74/558 |
| 4,782,872 | 11/1988 | Moschini | 74/558 |

FOREIGN PATENT DOCUMENTS

| | | | |
|---|---|---|---|
| 3838594 | 5/1990 | Fed. Rep. of Germany | 74/552 |
| 0151174 | 8/1985 | Japan | 74/558 |
| 0128878 | 6/1987 | Japan | 74/552 |
| 0176772 | 7/1988 | Japan | 74/552 |

Primary Examiner—David A. Scherbel
Assistant Examiner—Winnie Yip
Attorney, Agent, or Firm—Anderson Kill Olick & Oshinsky

[57] ABSTRACT

A steering wheel with a steering wheel rim which is covered by a cover of leather or a leather-like material. The cover is made of a single-piece material blank whose two longitudinal edges are connected to each other along the steering wheel rim. The connection of the two longitudinal edges is located on the underside of the steering wheel at a distance from the inner circumference of the steering wheel rim.

4 Claims, 5 Drawing Sheets

STEERING WHEEL

This is a continuation of application Ser. No. 07/492,729, filed Mar. 13, 1990 now abandoned.

BACKGROUND OF THE INVENTION

1. Field of the Invention

The present invention relates to a steering wheel with a steering wheel rim which is covered by a cover or casing of leather or a leather-like material. The cover or casing is made of a single-piece material blank whose two longitudinal edges are connected to each other along the steering wheel rim.

2. Description of the Related Art

Steering wheels whose rims are provided with a cover of leather or a leather-like material are manufactured by initially manufacturing the steering wheel proper and subsequently surrounding the steering wheel rim with the cover, wherein the cover is made of a single-piece blank which is placed around the steering wheel rim and is fastened to the steering wheel rim by connecting the two longitudinal edges of the blank.

In conventional steering wheels, the two longitudinal edges of the blank forming the cover are connected to each other along the inner circumference of the steering wheel rim by sewing or another similar type of connection, so that the connection is not located in the area of the gripping surfaces of the steering wheel. However, independent of the selected type of connection of the two longitudinal edges of the blank forming the cover, there is the difficulty that the location of the connection at the inner circumference of the steering wheel rim is not easily accessible, so that the manufacture of the connection is difficult and the costs of the steering wheel become higher.

It is, therefore, the primary object of the present invention to improve a steering wheel whose rim is provided with a cover of leather or a leather-like material, so that the manufacture of the steering wheel is significantly simplified, while the advantages of the known steering wheels are still present.

SUMMARY OF THE INVENTION

In accordance with the present invention, the connection of the two longitudinal edges of the blank forming the cover is located on the underside of the steering wheel at a distance from the inner circumference of the steering wheel rim.

In accordance with an advantageous feature of the invention, the distance at which the connection between the two longitudinal edges of the blank forming the cover is moved downwardly from the inner circumference of the steering wheel rim is approximately one-fourth to one fifth of the cross-section of the steering wheel rim. Accordingly, the connection of the two longitudinal edges is still outside of the gripping surface. However, the connection is now at a location which is more accessible and the manufacture of the steering wheel is made simpler.

The steering wheel according to the invention makes it possible to provide a connection of the two ends of the blank from the steering cover which is continuous and is located outside of the connection points of the steering wheel spokes with the steering wheel rim. In addition, the invention provides the possibility of using various different types of connections of the longitudinal edges of the blank forming the cover.

In accordance with a preferred embodiment of the invention, the connection of the two longitudinal edges of the blank forming the cover is a seam, preferably cross-stitch seam.

In accordance with another useful embodiment of the invention, the connection of the two longitudinal edges of the blank forming the cover located at a distance downwardly from the inner circumference of the steering wheel rim is obtained by a butt-jointed adhesive connection and an ornamental seam is provided at the connection for improving the optical appearance.

In accordance with another advantageous embodiment of the invention, the connection of the two longitudinal edges of the blank forming the cover located at a distance downwardly from the inner circumference of the steering wheel rim is obtained by gluing together overlapping, beveled longitudinal edges of the blank and by providing an ornamental seam at the connection for improving the optical appearance.

In accordance with another special feature of the invention, the two longitudinal edges of the blank forming the cover may have flanges which are glued together and are inserted in a circumferential recess in the steering wheel arrangement located at a distance downwardly from the inner circumference of the steering wheel rim.

In accordance with a further special embodiment of the invention, the connection of the longitudinal edges of the blank forming the cover located at the distance downwardly from the inner circumference of the steering wheel rim is obtained by clamping the longitudinal edges together, wherein the longitudinal edges of the cover are inserted in a circumferential groove in the steering wheel rim and are clamped relative to each other by means of an insert and, if necessary, are directly or indirectly glued together.

While a specific embodiment of the invention has been shown and described in detail to illustrate the application of the inventive principles, it will be understood that the invention may be embodied otherwise without departing from such principles.

BRIEF DESCRIPTION OF THE DRAWING

In the drawing:

FIG. 2b shows a detail, on a larger scale, of the embodiment of the steering wheel of FIG. 2a;

FIG. 3b shows a detail, on a larger scale, of the embodiment of the steering wheel of FIG. 3a;

DESCRIPTION OF THE PREFERRED EMBODIMENTS

Figure 1:
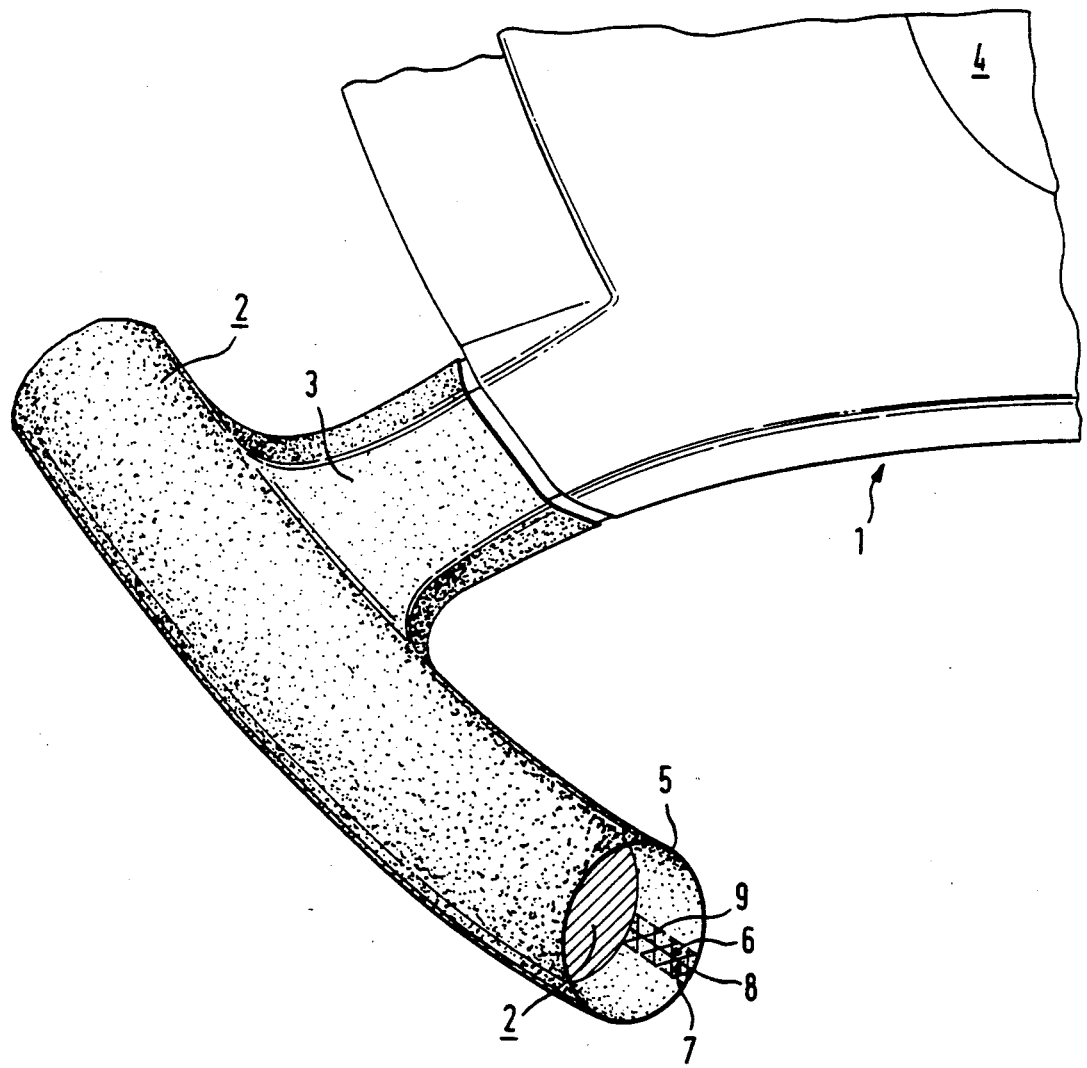
FIG. 1 is a partial perspective view of a steering wheel according to the present invention.

As illustrated in the drawing, a steering wheel 1 includes a steering wheel rim 2 which is connected through spokes 3 to a steering wheel hub 4 which is fastened to a steering shaft, not shown. The steering wheel rim is provided with a cover or casing 5 of leather or a leather-like material. In the embodiment shown in the drawing, the steering wheel rim 2 is made essentially of a foam material and has a circular cross-section.

Figure 6:
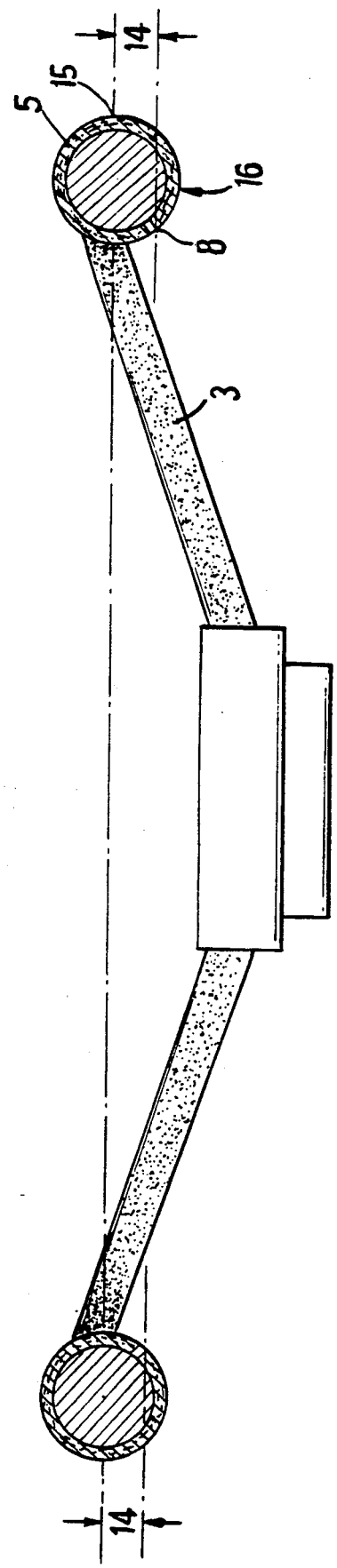
FIG. 6 is a sectional view of a steering wheel showing the location of the connection of the longitudinal edges of the steering wheel cover.

The cover 5 is made from a single-piece blank of a cover material. The two longitudinal edges 6 and 7 of the blank are connected to each other. As particularly shown in FIG. 6, the location 8 of the connection faces toward the center of the steering wheel and is offset from the center line 15 of the steering wheel rim towards the underside 16 thereof by approximately one-fifth of the cross-section of the steering wheel rim 2. In other words, the connection of the longitudinal edges 6 and 7 is located at a distance 14 downward from the center line 15 of the steering wheel rim 2.

In the embodiment shown in FIG. 1, the two longitudinal edges 6 and 7 are butt-jointed and are connected to each other by means of a cross-stitch seam 9, so that the cover 5 is simultaneously fastened to the steering wheel rim 2.

Figure 2A:
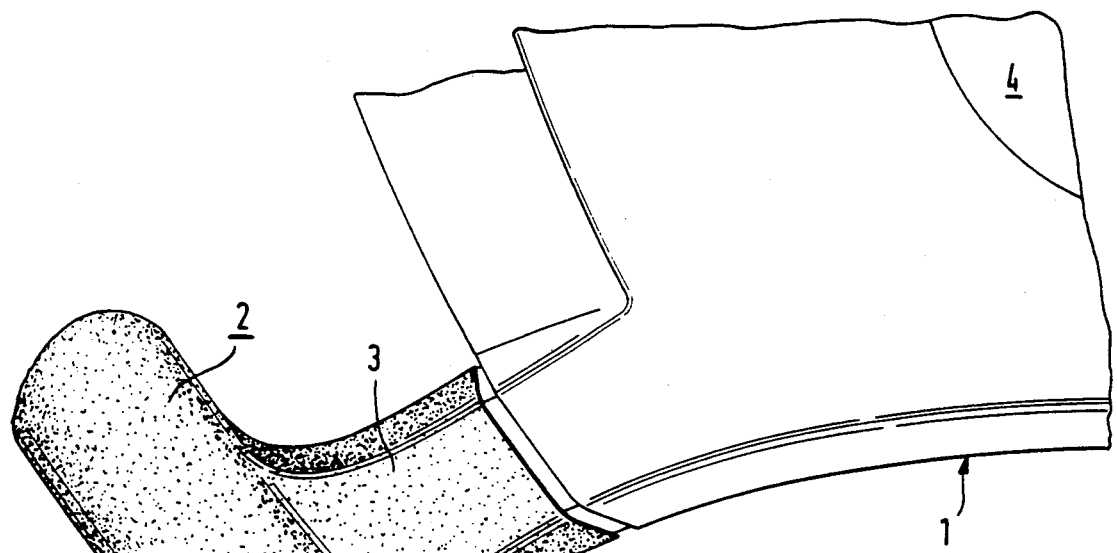
FIG. 2a is a partial perspective view of another embodiment of the steering wheel according to the present invention.
Figure 2B:
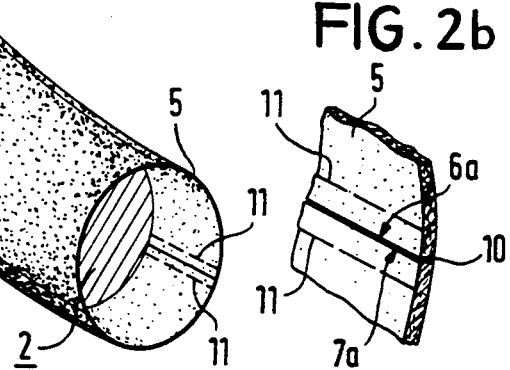

In the embodiment shown in FIG. 2, the two longitudinal edges 6a and 7a of the blank forming the cover 5 are also butt-jointed and are connected to each other by means of a glued connection 10. An additional ornamental seam 11 is provided for improving the optical appearance.

Figure 3A:
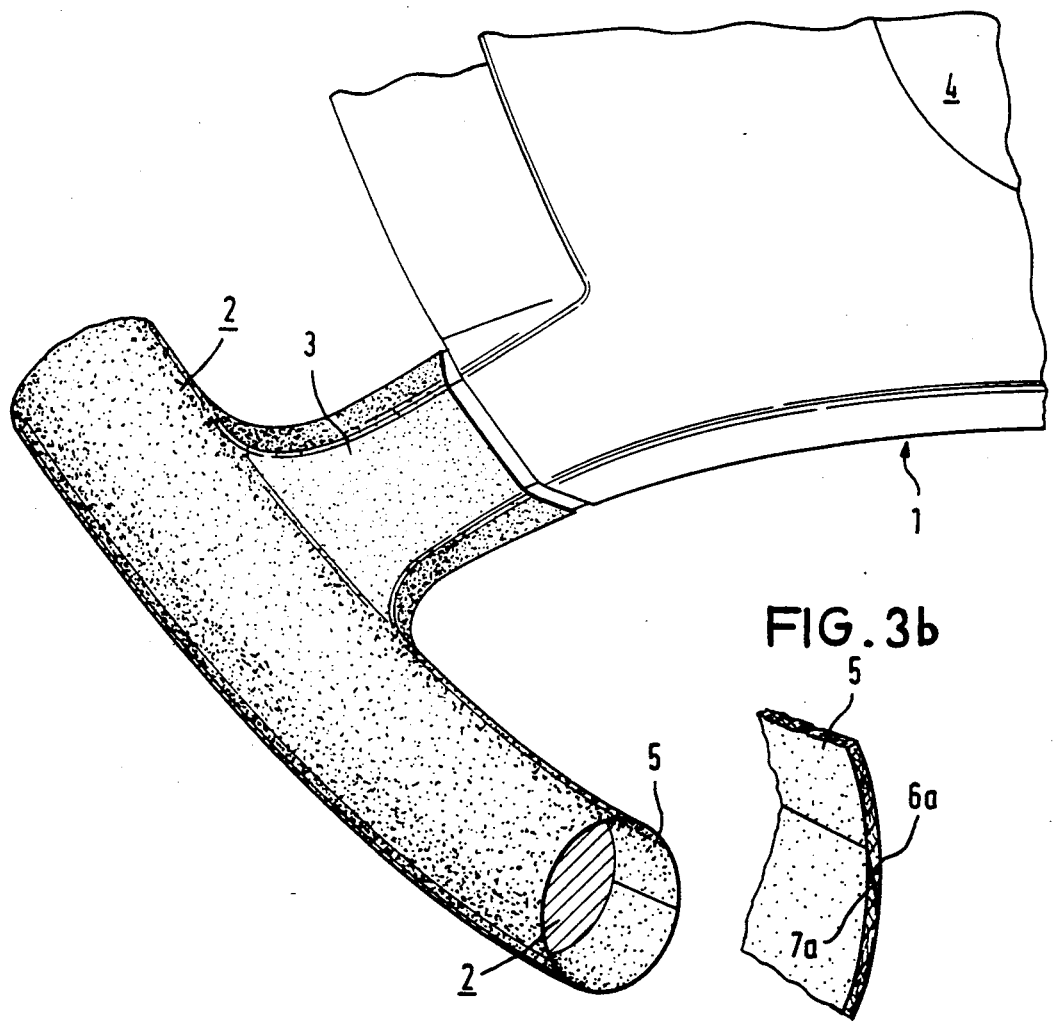
FIG. 3a is a partial perspective view of yet another embodiment of the steering wheel according to the present invention.
Figure 3B:
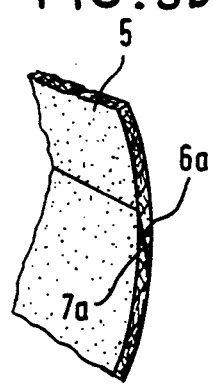

In the embodiment shown in FIG. 3, the two longitudinal edges 6b and 7b of the blank forming the cover 5 are beveled, wherein the edges overlap and are glued together.

Figure 4:
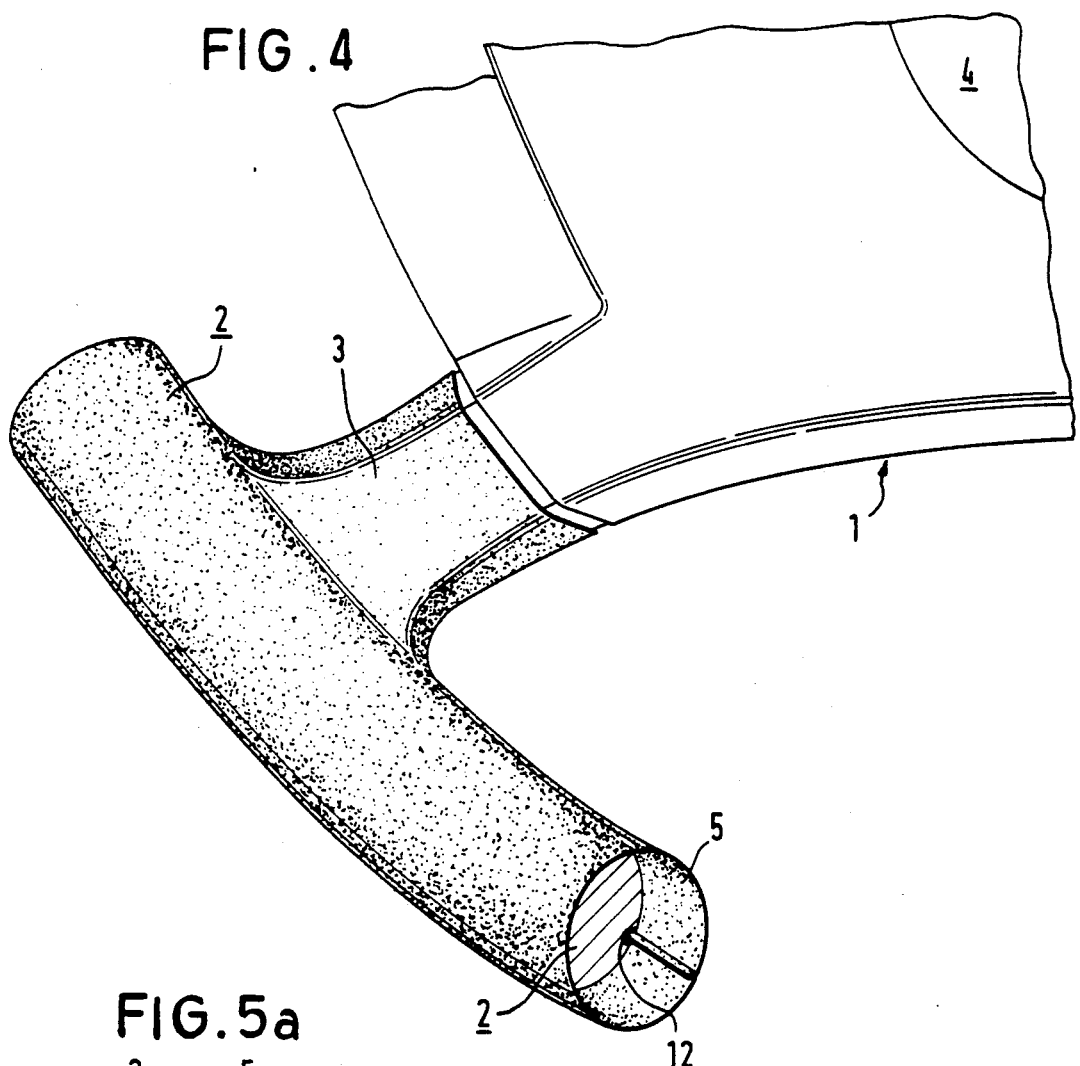
FIG. 4 is a partial perspective view of a further embodiment of the steering wheel according to the present invention.

In the embodiment shown in FIG. 4, the two longitudinal edges 6c and 7c of the blank forming the cover 5 are also butt-jointed and are provided with a perpendicularly projecting flange each which is inserted in a circumferential groove 12 of the steering wheel rim 2. The contacting flange surfaces are glued together.

Figure 5A:
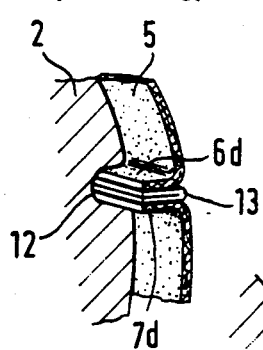
FIGS. 5a and 5b show details, on a larger scale, of the embodiment of the steering wheel shown in FIG. 4.
Figure 5B:
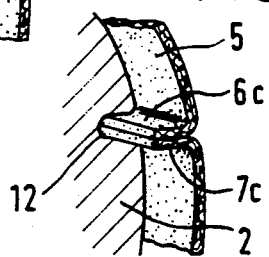

In the modified embodiment shown in FIG. 5, the two longitudinal edges 6d and 7d of the blank forming the cover 5 are also butt-jointed and have perpendicularly projecting flanges which are inserted in a groove 12 provided in the steering wheel rim 2. However, the longitudinal edges 6d and 7d are connected by clamping them by means of a spreading insert 13.

While specific embodiments of the invention have bee shown and described in detail to illustrate the application of the inventive principles, it will be understood that the invention may be embodied otherwise without departing from such principles.

I claim:

1. A steering wheel adapted to be grasped by a driver, comprising:

a steering wheel rim having an underside bellow a center line and a radial inner circumference intersecting said center line;

a plurality steering wheel spokes joining said rim at a point on said radial inner circumference;

a cover of leather or leather-like material for covering the steering wheel rim, wherein said cover is made of a single-piece material blank having two longitudinal edges having end faces, wherein said longitudinal edges are uniformly and uninterruptedly connected to each other at a connection extending along the entire steering wheel rim such that the end faces of the longitudinal edges abut each other and wherein the connection of the two longitudinal edges of the blank forming the cover is located on the underside of the steering wheel at a distance downward from said point on said radial inner circumference of said rim.

2. The steering wheel of claim 1, wherein the distance of the connection of the two longitudinal edges from the centerline is approximately one-fourth to one-fifth of the cross-section of the steering wheel rim.

3. The steering wheel according to claim 1, wherein the connection of the two longitudinal edges of the blank is a seam.

4. The steering wheel of claim 2, wherein the connection of the two longitudinal edges of the blank is a seam, wherein said seam is a cross-stitch seam.

* * * * *